(12) United States Patent
Noble et al.

(10) Patent No.: US 7,036,322 B2
(45) Date of Patent: May 2, 2006

(54) STORAGE TANK FOR CRYOGENIC LIQUIDS

(75) Inventors: Stephen Noble, West Vancouver (CA); Gregory C. Harper, Vancouver (CA)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 10/489,117

(22) PCT Filed: Apr. 2, 2003

(86) PCT No.: PCT/CA03/00473

§ 371 (c)(1),
(2), (4) Date: Sep. 13, 2004

(87) PCT Pub. No.: WO03/083356

PCT Pub. Date: Oct. 9, 2003

(65) Prior Publication Data

US 2005/0028536 A1    Feb. 10, 2005

(51) Int. Cl.
*F17C 1/00* (2006.01)
*F17C 13/00* (2006.01)
*B65B 31/00* (2006.01)

(52) U.S. Cl. ............... 62/45.1; 220/560.04; 141/7

(58) Field of Classification Search ............ 62/45.1, 62/48.1, 50.7, 268, 270; 220/560.04, 560.1; 141/7, 59

See application file for complete search history.

(56) References Cited

U.S. PATENT DOCUMENTS

| | | | | | |
|---|---|---|---|---|---|
| 2,764,873 | A | * | 10/1956 | Mooyaart | 62/50.2 |
| 2,912,830 | A | * | 11/1959 | Coldren et al. | 62/50.1 |
| 3,602,003 | A | * | 8/1971 | Hampton | 62/48.2 |
| 5,148,840 | A | * | 9/1992 | Grantham | 141/44 |
| 5,404,918 | A | | 4/1995 | Gustafson | 141/5 |
| 5,477,690 | A | | 12/1995 | Gram | 62/45.1 |
| 5,551,488 | A | | 9/1996 | Gram | 141/18 |
| 5,685,159 | A | * | 11/1997 | Kooy et al. | 62/50.1 |
| 6,109,293 | A | * | 8/2000 | Walrath et al. | 137/360 |
| 6,128,908 | A | | 10/2000 | Gustafson | 62/45.1 |
| 6,904,758 | B1 | * | 6/2005 | Hall et al. | 62/45.1 |

* cited by examiner

*Primary Examiner*—William C. Doerrler
(74) *Attorney, Agent, or Firm*—McAndrews, Held & Malloy, Ltd.

(57) ABSTRACT

A storage tank for cryogenic liquids incorporates an ullage vessel that provides for an ullage space. The ullage vessel is in communication through an ullage line to a fill line that provides cryogen to a cryogen space. The junction where the ullage line and fill line meet is of a certain cross-sectional area. Downstream of the junction, the fill line is of a greater cross-sectional area than at the junction. This creates a pressure reduction at the junction during filling, which causes a net flow of material from the ullage space over the course of filling. Once the tank is liquid full, causing cryogen to be redirected down the ullage line, the smaller cross-sectional area of the ullage line compared to the fill line causes a reduction in flow of cryogen which is detected by the fill pump causing filling to stop.

21 Claims, 6 Drawing Sheets

STORAGE TANK FOR CRYOGENIC LIQUIDS

FIELD OF THE INVENTION

The present invention relates to a storage tank design that incorporates an ullage space.

BACKGROUND OF THE INVENTION

Developments in combustion engine technology have shown that compression ignition engines, frequently referred to as diesel-cycle engines, can be fuelled by gaseous fuels instead of diesel without sacrifices in performance or efficiency. Examples of such fuels include natural gas, methane, propane, ethane, gaseous combustible hydrocarbon derivatives and hydrogen. Substituting diesel with such gaseous fuels generally results in cost, availability and emissions benefits over diesel.

One challenge in using gaseous fuels for such applications, however, is that it is difficult to store gaseous fuels as efficiently as liquid fuels. This is an important consideration where space for storage is limited. For example, on-board fueling systems for natural gas vehicles benefit when those systems can be accommodated in the limited space available freeing up transport capacity.

Natural gas and other gaseous fuels can be stored in tanks either as compressed gas (CNG in the case of natural gas), or cryogenically as a liquid (LNG in the case of liquefied natural gas). The advantage of LNG over CNG is that its energy density is much higher than an equivalent volume of CNG. Natural gas stored as LNG allows for more fuel to be stored per unit volume.

For the purposes of this application, cryogenic fuels include those liquids fuels that boil at temperatures at or below −100 C. under atmospheric pressures. An example of such fuel is LNG. Note, while the present invention is discussed in regards to LNG, it is equally as applicable to other cold or cryogenic fuels or gases generally. This would be understood by a person skilled in the art. By way of example, the disclosed tank accommodates other hydrocarbons such as methane, ethane, propane and hydrocarbon derivatives. Further fuels and gases such as hydrogen, helium, nitrogen and oxygen all benefit as cryogens to the present invention.

While, as mentioned above, there are special economies to utilizing LNG, cryogenic storage presents its own challenges. One of the challenges of LNG is that, in many applications, once delivered into a holding tank, it needs extra space in which to expand if the LNG warms.

While the main concern to be addressed in this application is LNG expansion, LNG may, in some applications, need to be stored at cryogenic temperatures over extended periods of time. Excessive heat leakage into a cryogenic tank, as well as causing the LNG itself to expand, will cause the cryogenic liquid to boil. Eventually, with continued heat leakage, LNG will boil or evaporate resulting in excessive stresses on the storage tank caused by pressure build-up. A way of dealing with pressure build-up associated with boiling or evaporation (or, for that matter, LNG expansion) is to provide a relief valve in the inner vessel to vent off gas after the pressure in the vessel has reached a pre-determined limit. However, for a variety of reasons, it is undesirable to routinely vent natural gas into the atmosphere. For example, methane, the major component of natural gas, is a greenhouse gas. Also, venting fuel is uneconomical as this releases unused fuel into the atmosphere. Therefore, an alternative solution to venting is desirable.

One further way of limiting the amount the LNG expands or the amount of LNG to boil over time, is to ensure that the storage tank is well insulated minimizing the amount of heat allowed to leak into the tank. By way of example, an evacuated space can be used to separate and insulate an inner storage vessel where the cryogen is stored from an outer jacket exposed to the ambient environment. However, regardless of the effectiveness of the insulation used to prevent heat leakage into the cryogenic fluid or liquid, some heat paths will exist between the outer jacket and the storage vessel. For example incomplete evacuation of the space disposed between the outer jacket and inner vessel may cause heat leakage. Heat paths may also arise from support members within the evacuated space provided to suspend the inner vessel within the outer jacket. Conduits or lines into the cryogen space used, by way of example, to fill, empty, and vent the cryogen space within the inner vessel, also introduce heat paths. In any event, the inner vessel cannot be completely insulated.

A means of dealing with LNG expansion is to provide an ullage space within the inner vessel. An ullage space can also be used to accommodate any boiling or evaporation of LNG in some applications where LNG is stored after a vessel is filled as would be understood by a person skilled in the art. For most applications, however, an ullage space is provided to deal with liquid expansion. For the purposes of this disclosure, while reference will be made to accommodating LNG expansion, the ullage space can be adapted to accommodate LNG expansion or boiling or evaporation, as would be understood by a person skilled in the art.

An ullage space is a space within the tank for the LNG to expand into. One problem with this solution is that it is difficult to leave an adequate space during filling. In other words, refueling must be stopped at some pre-determined point prior to the storage tank reaching liquid full. Ideally, the ullage space should be large enough to allow for LNG expansion yet small enough to maximize the amount of cryogen that can be held in the inner vessel and, thereby, maximize the time between refueling. As noted above, this is valuable in natural gas vehicle operations where fuel systems attempt to maximize the volume they can store within the limited space available on a vehicle while minimizing the space utilized to store that fuel.

A variety of means have been developed to determine a fill point that leaves an adequate ullage space.

Visual fill lines may not provide the level of accuracy required. Also, given the double vessel structure of many tanks, it is not easy to provide a sight port through to the inner vessel.

Stop mechanisms such as shut-off floats or valves require mechanical parts within the inner vessel. This introduces into the storage tank a mechanical failure point that is subjected to wear during and between each fill. The introduction of such a failure point may, in many cases, be the failure point that determines the life of the tank. Access to the interior of the tank, and therefore, to mechanical parts within the tank is difficult if not impossible due to the need to thermally isolate the inner tank from the outside environment. Therefore, repair of a mechanical part is not practical in many cases. As such, failure of a mechanical stop mechanism generally requires replacement of the storage tank.

Further, such a stop mechanism needs a means of communicating with the filling pump directly or indirectly so that it is able to shut-off the pump once the ullage space has been provided. Such a means of communication may introduce another heat path into the cryogen space within the inner vessel.

A further alternative to providing an ullage space is to introduce an ullage vessel in communication with the inner vessel. This vessel would include a valve or restrictive opening dimensioned to allow gas to flow into the ullage space during filling but restrict flow of liquid. Once the space outside the ullage vessel is full, cryogen will then be forced into the ullage space within the ullage vessel. Due to the dimensioning of the ullage opening in the ullage vessel or the nature of a valve disposed in the ullage vessel, the resistance to flow of cryogenic liquid into the ullage space once the cryogen space is liquid full will create a pressure rise that can be detected by the fill pump or operator. When detected, the fill pump will shut off. Some of the gas within the ullage space will be cooled and condense out during filling as the cryogen space fills cooling the ullage vessel.

This system, however, will, generally, leave a quantity of gas within the ullage space at the end of filling the cryogen space that is equal to or greater than the quantity in the ullage space initially. While some of the gas present prior to filling will be condensed to liquid by the cooler cryogen environment, this will, in many cases, be a relatively small amount of the total residual gas initially present. Also, some of the cryogen provide may evaporate into this space during filling. The volume of gas initially present within the ullage space plus any additional evaporated gas from the cryogen added to the cryogen space should, therefore, be taken into consideration when determining the desired volume of the ullage space.

Further, this method of providing an ullage space presents problems in the case where the cryogen tank has not been emptied between fills. After a refueling, the ullage vessel will allow LNG to expand into the ullage space due to the processes described above. Also, gravity will frequently force, over time, LNG into the ullage vessel through the restrictive opening. As such, depending on the orientation of the opening in the ullage vessel and the level of the cryogen tank generally, the ullage vessel will be at least partially filled with LNG until the LNG in the cryogen space is drawn down below the ullage space opening allowing gravity to force any LNG in the ullage space to flow out of this space into the cryogen space. In many cases, however, it is desirable to refuel prior to a point where the LNG tank is completely empty. In the prior art design, however, initial refueling is into a tank with a partially filled ullage space. As such, the ullage space may not inadequately allow for LNG expansion upon completion of refueling.

The present invention addresses the problems in the prior art noted above.

SUMMARY OF THE INVENTION

A cryogenic tank assembly for holding a cryogenic fluid is disclosed comprising a vessel with a cryogen space, an ullage vessel with an ullage space, and a fill conduit. The fill conduit includes an inlet for receiving the cryogenic fluid from outside the cryogenic tank assembly and an exit within the cryogen space for delivering the cryogenic fluid to the cryogen space during a course of filling of the cryogenic space. The fill conduit further includes a broad passage with a cross-sectional area, and, a narrow passage with a cross-sectional area that is smaller than the cross-sectional area of the broad passage. The broad passage is downstream of the narrow passage. Further, the tank includes an ullage conduit with a cross-sectional area that is smaller than the cross-sectional area of the narrow passage. The ullage conduit includes an exit into the fill conduit within the narrow passage, and an ullage opening into the ullage space. The cryogenic fluid is restricted from the ullage space during the course of filling.

A further embodiment of the invention includes the cryogenic tank assembly where the ullage space is substantially empty of cryogenic liquid upon completion of the course of filling.

A further embodiment of the invention includes a cryogenic tank assembly with a fill conduit that comprises a slope between the narrow passage and the broad passage. The slope passage expands from the narrow passage cross-sectional area to the broad passage cross-sectional area over a distance determined to reduce flow separation within said cryogenic fluid in the fill line during said course of filling.

A further embodiment of the invention includes the cryogenic tank assembly with the fill conduit further defining a second broad passage upstream of the narrow passage. The second broad cross-sectional area is greater than the narrow passage cross-sectional area.

A further embodiment of the cryogenic tank assembly includes an ullage vessel sealed except through the ullage passage.

A further embodiment of the cryogenic tank includes the ullage vessel with a restrictive drainage opening providing communication between the cryogen space and the ullage space. This opening is to allow drainage of cryogenic liquid from the ullage vessel prior to the course of filling.

Also, the present disclosure includes a method of filling a cryogenic storage tank with a cryogenic fluid while preventing an ullage space at an initial pressure from being filled with the cryogenic fluid during filling. The method comprises delivering the cryogenic fluid to the cryogenic storage space through a fill conduit with a narrow passage and a broad passage. The broad passage is disposed downstream from the narrow passage. Also fluid communication between the narrow passage and the ullage space through an ullage conduit is allowed. The ullage conduit defines an ullage exit into the fill conduit at the narrow passage. The method further provides for selecting a flow rate for the cryogenic fluid through the fill conduit such that a narrow passage pressure is established at the ullage exit. The passage pressure should be lower than the initial pressure while the cryogen space is being filled with the cryogenic fluid. Flow through the fill conduit is then stopped when the cryogen space is substantially liquid full.

The flow may be stopped by detecting a drop in flow rate caused when the cryogen space is substantially liquid full. The drop in flow rate is caused by flow diversion through to an ullage passage that is more restrictive than flow through the narrow passage.

A further embodiment of the invention includes draining at least some of the cryogenic liquid from the ullage space prior to delivering the liquid to the cryogen space.

A further embodiment of the method includes introducing a flow rate wherein cryogenic fluid is delivered through the fill conduit substantially free of flow separation.

The present invention provides for an ullage space that is at least partially evacuated upon completion of filling a cryogen vessel thereby reducing the volume necessary for the ullage space than otherwise required. Also, by reducing ullage space, this space can be evacuated during filling or prior to filling more quickly.

The present invention provides for an ullage space that is at least partially evacuated during refueling thus allowing for a consistent ullage volume regardless of the presence of any residual LNG in the ullage vessel prior to refueling.

DETAILED DESCRIPTION OF PREFERRED EMBODIMENT(S)

In the present method, a cryogenic tank is disclosed that utilizes pressure to provide an ullage space within an LNG tank at the completion of refueling the tank. Specifically, the Bernoulli principle is utilized to secure and maintain an at least partially evacuated ullage space within the LNG tank.

Figure 1:
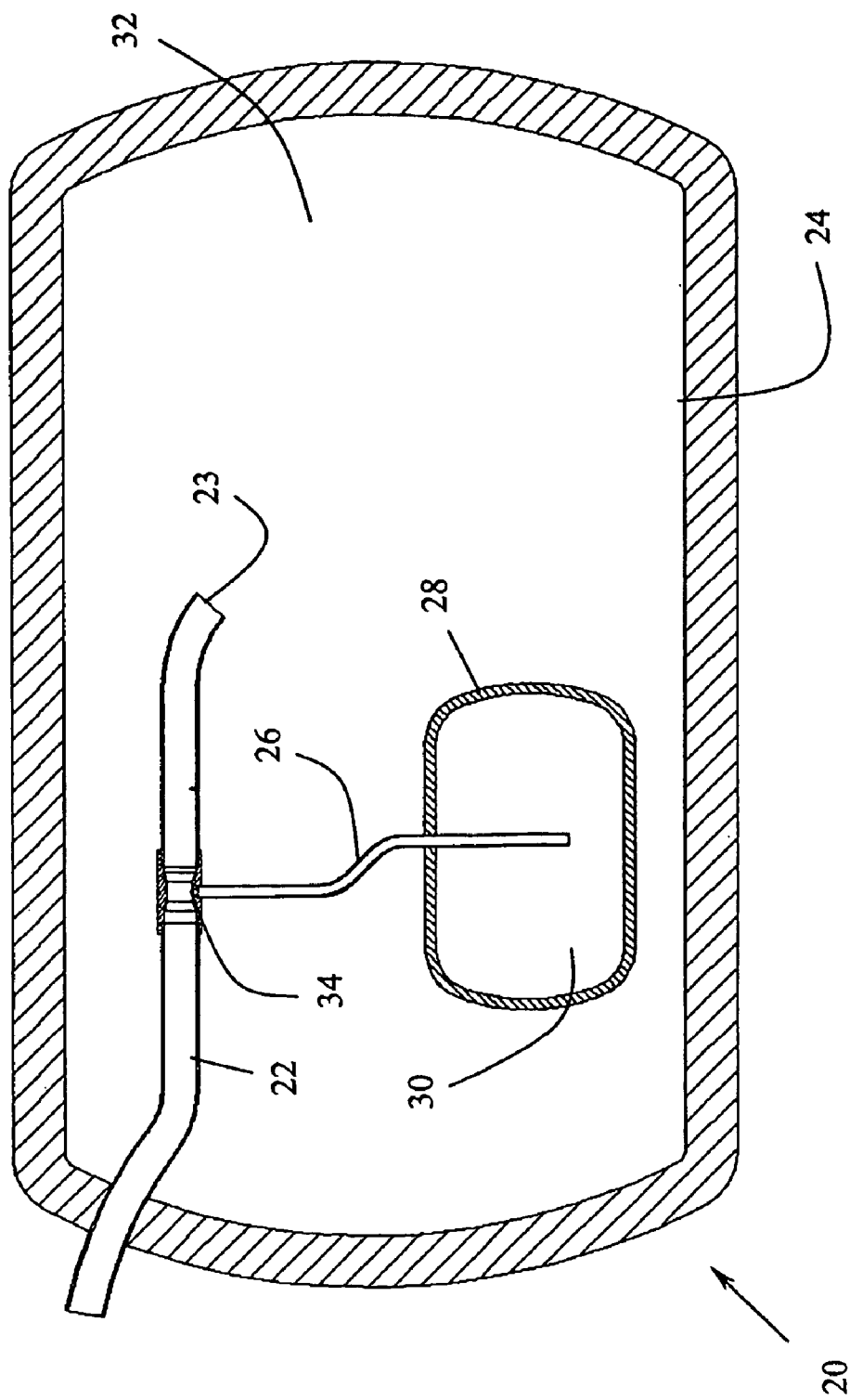
FIG. 1 shows a cross-sectional view of a preferred embodiment of the subject tank with an inner vessel and ullage vessel.
Figure 2:
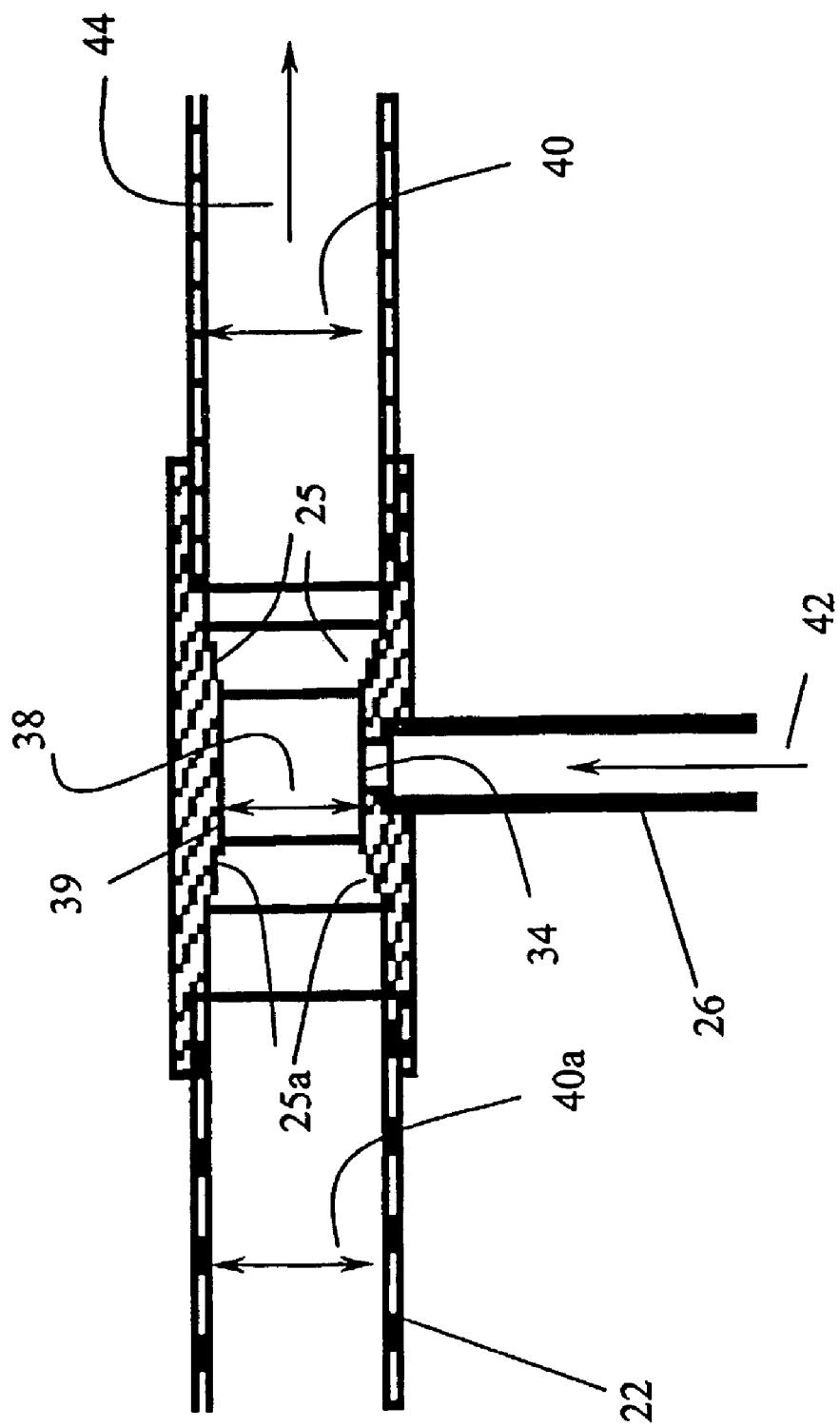
FIG. 2 shows a cross-sectional view of a close-up of the subject tank shown in FIG. 1 near the junction of the fill line.

Referring to FIG. 1, cryogenic tank 20 is shown. Referring to FIG. 2, a close-up of cryogenic tank from FIG. 1 is shown near junction 34. Refueling line 22 extends from a point outside tank 20 to opening 23 disposed within inner vessel 24. Refueling line 22 has at least two distinct cross-sectional areas along its path. These areas are determined by venturi diameter 38 and line diameter 40 as the refueling line is generally cylindrical. Slope 25 joins that portion of refueling line 22 with venturi diameter 38 with the portion of refueling line 22 with line diameter 40. Venturi diameter 38 is smaller than line diameter 40. Slope 25 is set at an angle joining the venturi diameter section and line diameter section. Another way of referring to this angle is to refer to the length of slope 25 measured parallel to the venturi line and refueling line. The portion of the refueling line that comprises venturi diameter 38 is generally referred to as venturi line 39. The ratio of venturi diameter 38 to line diameter 40 is the venturi ratio.

Slope 25a and line diameter 40a are generally the same as slope 25 and line diameter 40, however they need not be. In this embodiment line diameter 40a is larger than venturi diameter 38.

Extending from refueling line 22 at junction 34 is ullage line 26 which runs from junction 34 on refueling line 22 through to ullage vessel 28. Ullage line 26 provides, in the embodiment shown, the only means of communicating between ullage space 30 within ullage vessel 28 and cryogen space 32 within inner vessel 24. That is, ullage line 26 is sealed on one end within ullage space 30 and communication between ullage space 30 and cryogen space 32 is through ullage line 26 and refueling line 22.

In FIG. 2, two arrows are shown representing ullage flow direction 42 and fuel flow direction 44. Upstream and downstream is referred to herein in regards to fuel flow direction 44.

Figure 3:
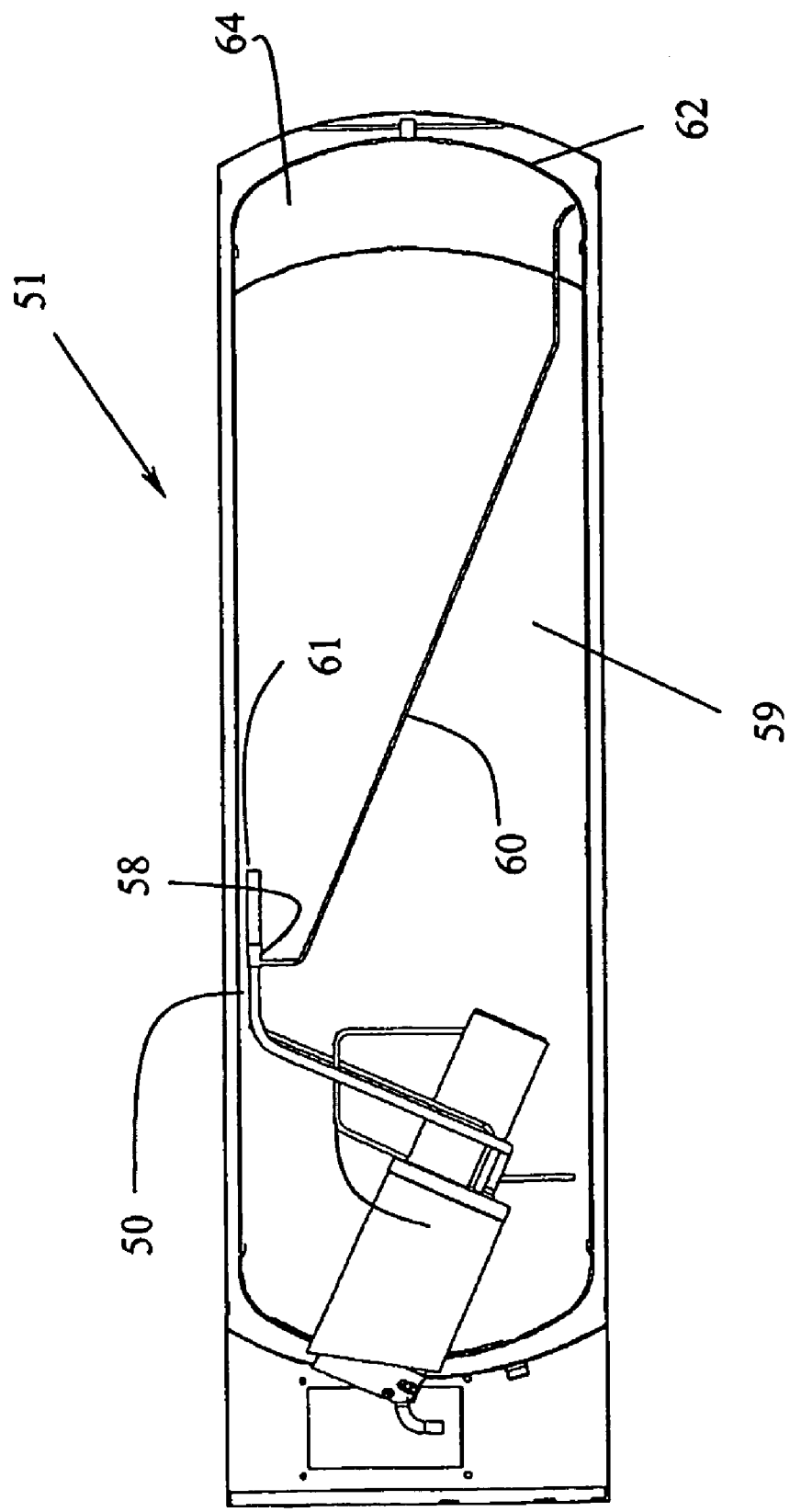
FIG. 3 shows a cross-sectional view of a second preferred embodiment of the subject tank with an inner vessel and an ullage vessel.
Figure 4:
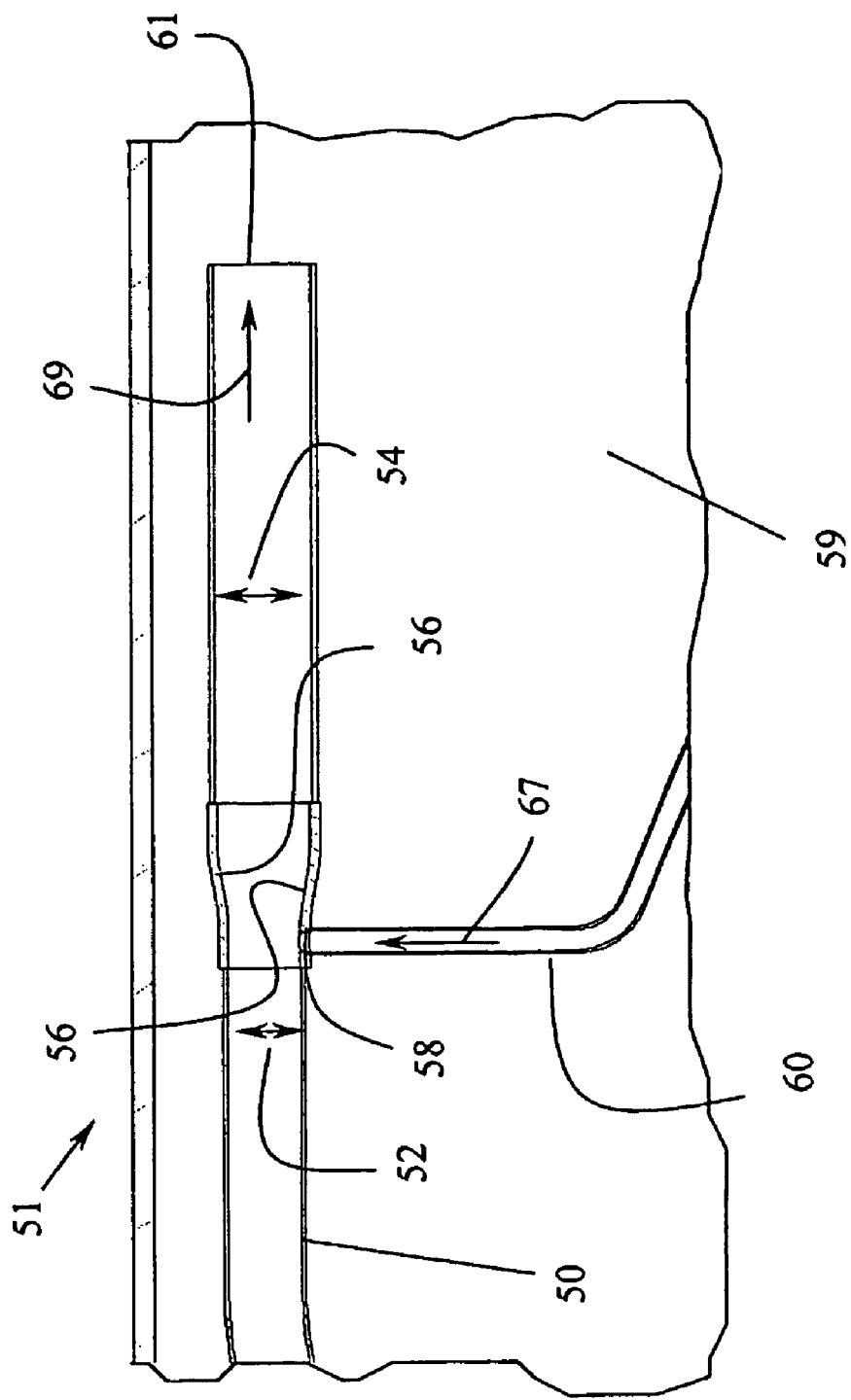
FIG. 4 shows a cross-sectional view of a close-up of the subject tank shown in FIG. 3 near the junction of the fill line.

Referring to FIG. 3, a second embodiment of the subject tank is shown. FIG. 4 shows a close-up of the second embodiment from FIG. 3 centered near junction 58. This embodiment of tank 51 utilizes an expansion rather than a venturi to help provide the ullage space desired. This embodiment shows refueling line 50 with line diameter 52 and expanse diameter 54. The refueling line includes slope 56 separating that part of the refueling line with line diameter 52 and that part of refueling line with expanse diameter 54. Slope 56 is set at a slope angle which may also be considered in regards to the length of slope 56 measured parallel to the refueling line. Junction 58 is positioned within the refueling line upstream of slope 56 within that part of refueling line 50 of line diameter 52.

Expanse diameter 54 is greater than line diameter 52. The ratio of expanse diameter 54 to line diameter 52 is referred to herein as the expanse ratio.

Refueling line 50 opens into cryogen space 59 at opening 61.

At junction 58, ullage line 60 runs from the refueling line through to ullage vessel 62 positioned, in this embodiment, at the bulkhead of tank 51. In this embodiment, the ullage line is closed to cryogen space 59 except through refueling line 50.

Accordingly, ullage space 64 is isolated from cryogen space 59 except for the passage provided through ullage line 60 and refueling line 50.

Referring to FIG. 4, specifically, two arrows are shown representing ullage flow direction 67 and fuel flow direction 69. Upstream and downstream are referenced in regards to fuel flow direction 69.

Figure 5:
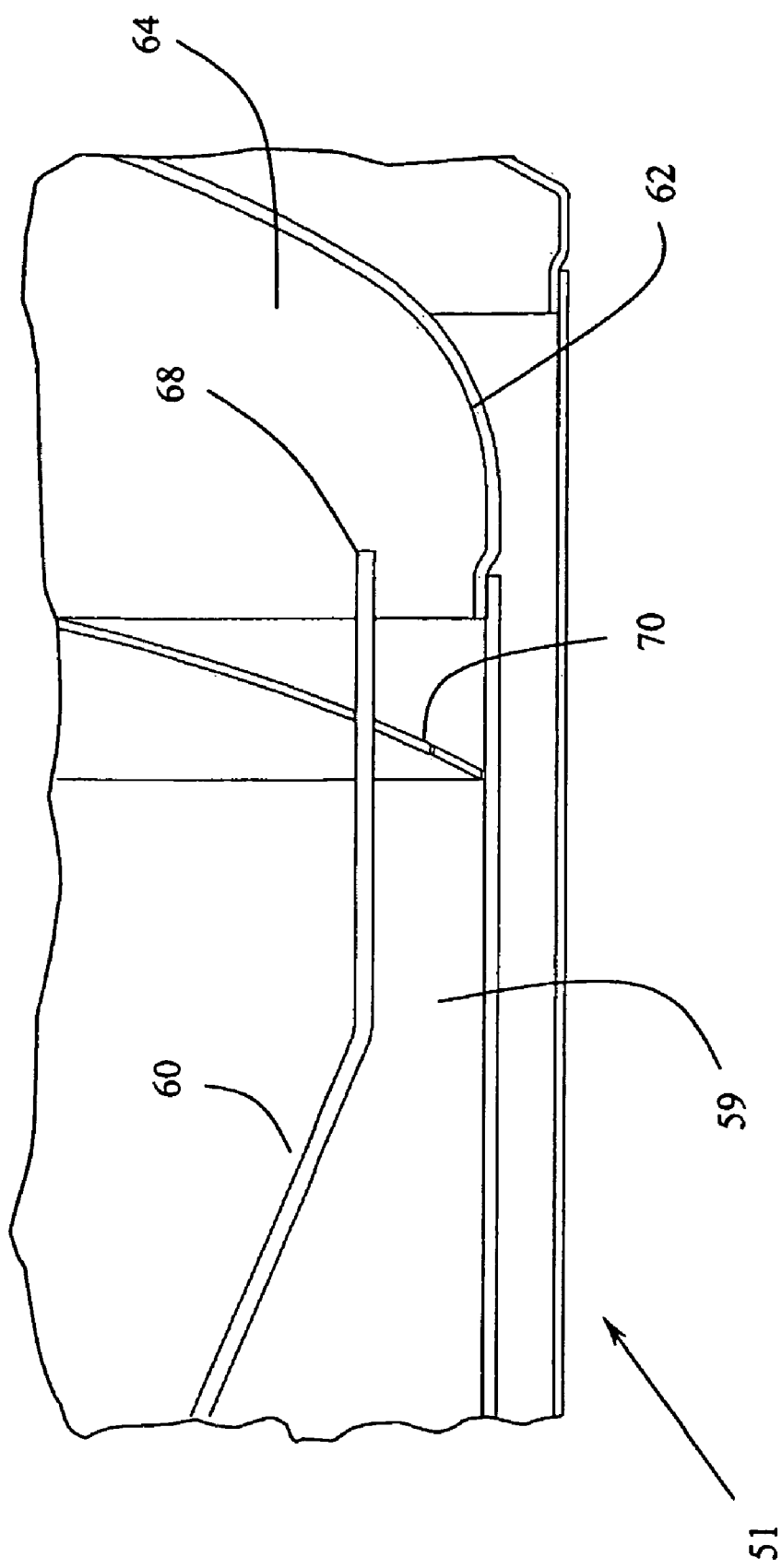
FIG. 5 shows a cross-sectional view of a third embodiment of the subject tank showing a close-up of the tank near the point where the ullage vessel and ullage line meet.

Referring to FIG. 5, a close-up of an alternate embodiment of tank 51, is shown at opening 68 of ullage line 60 into ullage space 64. This embodiment provides drain path 70 leading from ullage space 64 through to cryogen space 59. Here, ullage space 64 is in communication with cryogen space 59 through both drain path 70 and ullage line 60 via refueling line, not shown.

Figure 6:
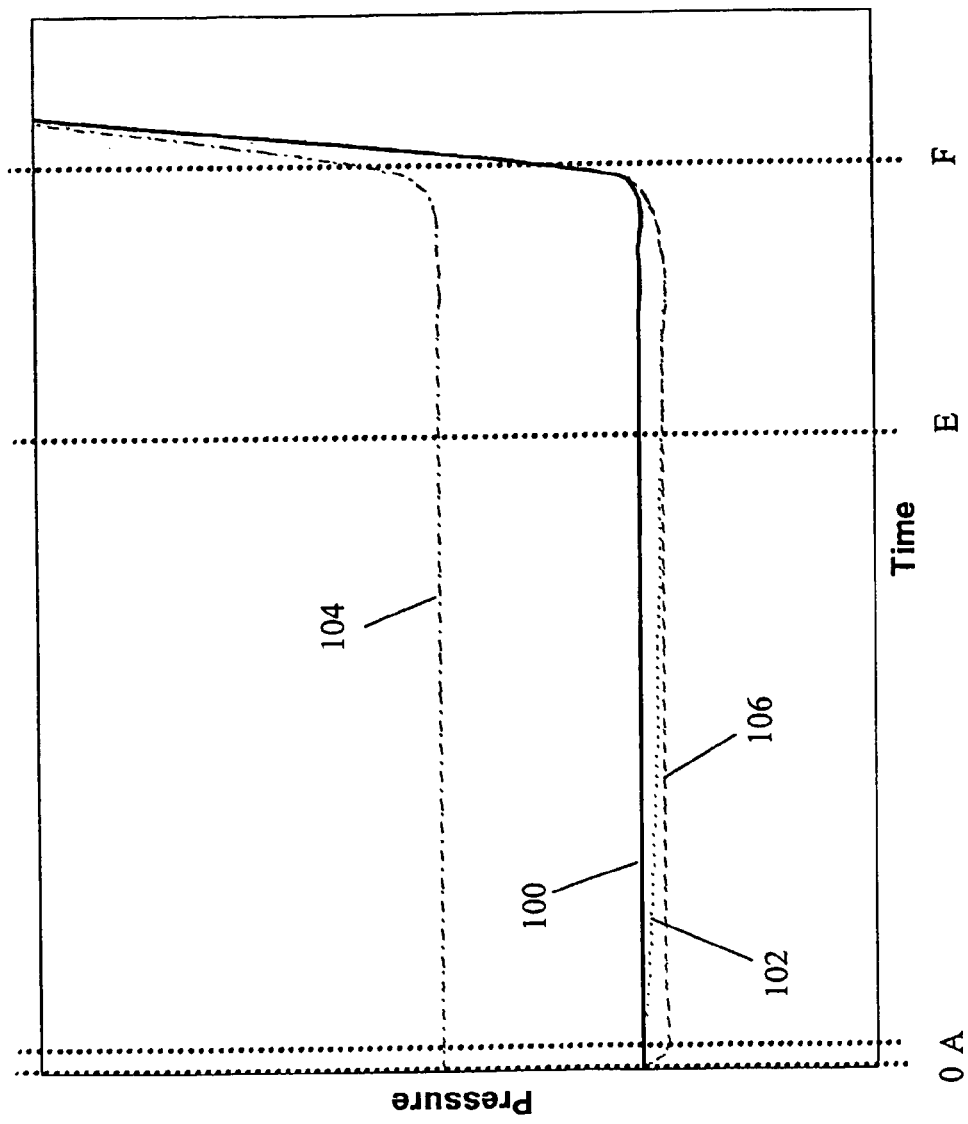
FIG. 6 is a graph of pressure versus time reflecting the pressure at various points in the vessel during the course of filling the subject tank.

Referring to FIG. 6, a graphical representation of various pressures at various points within tank 20 are plotted against time. Pressure is shown on the vertical axis and time is shown on the horizontal axis. Time, T=0, is measured from a point at the commencement of refueling, after which LNG is pumped through refueling line 22 past junction 34 and out through opening 23 to cryogen space 32. At time, T=F, the refueling pump is shut-off and the graph ends.

Cryogen pressure 100 is shown and represents the background pressure within cryogen space 32 at the commencement of refueling tank 20 and during the course of refueling. For the purposes of the application and for simplification, no vapour collapse is considered to take place within cryogen space 32. Ullage pressure 102 is shown and represents the pressure within ullage space 64 during refueling. Flow pressure 104 is shown and represents the pressure of flow within refueling line 22 during refueling at a point generally well upstream within the refueling line. Finally, junction pressure 106 is shown and represents the pressure found at junction 34.

While FIG. 6 shows pressures over the course of refueling with reference to the embodiment provided in FIGS. 1 and 2, the same general pressure vs. time plot would result for the embodiment provided in FIGS. 3 and 4. Moreover, the graph does not give actual times or pressures but only provides a general relative measure of pressure at the points noted within the tank. As would be understood by a person skilled in the art, the actual values of pressure and time within the tank vary depending on number of variables including pump pressure, materials, flow rate, initial or static pressure, venturi diameter (or expanse diameter as the case may be), slope angle, and line diameter.

Referring to the interior of tank 20, at commencement of refueling, cryogen space 32, ullage space 30, ullage line 26 and refueling line 22 are all at or near a steady state pressure, see point T=0 shown as pressure for lines 100, 102 and 106. Flow pressure 104 at T=0 represents the pressure at which LNG is introduced through refueling line 22 at the commencement of refueling before any LNG has passed by junction 34. A fill nozzle extending from LNG source has been attached to refueling line 22. LNG is pumped from a holding tank to the cryogen space.

Note also, that prior to refueling at T=0, the cryogen space and ullage space will, be at a steady state temperature. Some heat typically transfers into the cryogen environment over the period since the last refueling thus causing some LNG to boil providing some additional quantity of gas within the ullage space and cryogen space beyond that present due to equilibrium conditions. This quantity is generally dictated by the temperature within the cryogen space and ullage space and the vent pressure set for any venting valve within the these spaces.

Shortly after T=0, the refueling pump directs LNG through opening 23 into cryogen space 32 to begin filling tank 20. However, prior to reaching opening 23, the LNG passes through venturi line 39. The diameter of venturi line 39, as noted above, represents a narrowing of the refueling line. The refueling line after junction 34 expands through slope 25 to line diameter 40. Therefore, a volume of LNG will pass through a given cross-sectional area along refueling line 22 with line diameter 40 over a given period of time. The same volume is forced through the smaller cross-sectional area in venturi line 39 of diameter 38 over the same period of time. Therefore, flow speed within venturi line 39 is faster than flow speed downstream of venturi line 39 beyond slope 25 where the refueling line has a cross-sectional area determined by line diameter 40. This flow rate in the venturi line sets up a venturi effect. That is, pressure is reduced within the venturi line. The reduced pressure within venturi line 39 affects pressure at junction 34. That is, pressure at junction 34 drops from its initial pressure. In turn, this affects the pressure in ullage line 26 and ullage space 30. A pressure differential is created between the ullage space and the junction. This will set up ullage flow in direction 42.

Referring to FIG. 6, initially, the ullage pressure 102 is at equilibrium and equal to the pressure in cryogen space 32. However, immediately after filling commences, junction pressure 106 falls, ΔP, below this initial steady state pressure setting up a pressure gradient between junction 34 and ullage space 30 as seen at time, T=A. As such, ullage pressure 102 is driven to equilibrate to the same pressure as that found at junction 34. Therefore, once a pressure gradient is established by LNG flowing through venturi line 39, there is an initial net flow of residual gas or liquid, assuming some is initially present, out of the ullage space through ullage line 26, in ullage flow direction 42. Depending on the pressure head and the configuration of the tank, this residual gas and liquid, if any, may be drawn into refueling line 22. Gas drawn into refueling line 22 will generally be liquefied within refueling line 22. These contents flowing from the ullage space are added to cryogen space 32.

As seen in FIG. 6 at time T=E, junction pressure 106 and ullage pressure 102 approach an equilibrium state over the course of refueling. Depending on the factors that include size of the ullage space, the pressure head created and the refueling time, a steady state is eventually established during refueling between the pressure at junction 34 and the pressure in ullage space 30 that is approximately ΔP below the original steady state pressure found within the ullage space prior to commencement of refueling. While the venturi effect continues throughout refueling, this new equilibrium is generally maintained with some adjustments arising as result of changes in the flow rate of LNG through refueling line 22 and any condensation that may occur regarding any remaining gas within ullage space 30. Ullage vessel 28 may be cooled by LNG introduced into cryogen space 32.

Considering the cryogen space, at the start of refueling a flow pressure is chosen that exceeds the steady state cryogen pressure (102 at T=0) thereby allowing LNG to enter into cryogen space 32. This is graphically represented in FIG. 6 by the difference in cryogen pressure 100 and flow pressure 104. Note, as the tank fills, the cryogen pressure may change or may not change. In FIG. 6, cryogen pressure 100 stays fairly constant through out filling and spikes when the tank reaches liquid full. However, cryogen pressure 100 can be affected during refueling by such things as vapor collapse. For the purposes of this application, however, it will be assumed that cryogen pressure 100 remain constant up to a point near when the cryogen space reaches liquid full.

Eventually, as suggested above, the cryogen space reaches liquid full during refueling. The cryogen pressure rises quickly after this point, point F on FIG. 6. As LNG is filled within refueling line 22 downstream of slope 25 when cryogen space is liquid full, flow past junction 34 to the opening ceases, ending the venturi effect established at the junction. As such, the pressure gradient at junction 34 spikes quickly as LNG is directed through the only remaining empty space, the ullage space. The pressure gradient is now opposite of that experienced shortly after filling started. In effect, a gradient is established through ullage line 26 into ullage space 30 that creates a flow opposite in direction from ullage flow direction 42.

At this point, point F on FIG. 6, the significant pressure rise occurring around junction 34 is detected upstream along the refueling line. This is caused, at least partially, by selecting at junction 34 an ullage line 26 having a cross-sectional area smaller than the cross-sectional area of venturi line 39 determined by venturi diameter 38. Therefore, an equivalent volume of fluid is suddenly being directed through a much smaller area. Once this pressure spike is detected upstream along the refueling line, the pump is stopped, point F on FIG. 6.

Just prior to shutting down the pump, a small quantity of LNG may be introduced into ullage vessel 28. As would be apparent to a person skilled in the art, this amount of LNG should be similar in each refueling operation and, therefore, can be taken into consideration when designing the volume desired for the ullage vessel.

Once refueling is stopped terminating flow into cryogen space 30, an amount of LNG may flow into ullage space 30 through ullage line 26 depending on the pressure gradient established between the ullage space and the cryogen space upon completion of refueling. Generally, one way these gradients may be created is by gravitational forces driven by the relative orientation of the ullage vessel, ullage line and refueling line. Also, fluid and gas pulled out of ullage space 30 will likely result in a drop in pressure in this space as it is at least partially evacuated. This drop in pressure may be below the final pressure within the cryogen space resulting in a tendency to equalize these pressures. Ultimately, regardless of such redistribution, what is important is that the ullage space be provided at the completion of refueling. As the ullage space is partially evacuated, an additional space within the same volume is provided for LNG to expand into compared to the situation had the ullage space not been partially evacuated.

Referring to FIGS. 3 and 4, an alternate embodiment of the present invention is provided. This embodiment includes an expansion from junction 58 along slope 56 to the downstream portion of refueling line 50 of an expansion diameter 54. With refueling tank 51, the same basic principle is used to provide a reduced pressure at junction 58 as was the case at junction 34 in the previously described embodiment. As LNG is pumped through refueling line 50 a pressure reduction is created at junction 58 where the cross-sectional area at junction 58 as determined by line diameter 52 is smaller than the cross-sectional area of the refueling line downstream of slope 56 as determined by expanse diameter 54. Again, the flow speed near junction 58 is faster than the flow speed in the expansion, in order to maintain volume flow. Therefore, pressure is decreased at the junction.

As junction 58 is in communication with ullage space 64 through ullage line 60, the initial pressure within ullage space 64 is brought down as a result of pressure drop at junction 58. This, as was the case above, causes a net flow of gas or liquid from ullage space 64 in ullage flow direction 67 as described above.

At the completion of refueling, the pressure drop caused by flow will cease as the flow through slope 56 will comes to an end causing a pressure rise at junction 58. Again ullage line 60 has a smaller cross-sectional area than that of the refueling line at junction 58, therefore, a marked pressure rise will occur signaling to the station to shut-down the refueling pump or otherwise stop refueling.

In either of the two embodiments discussed, a venturi line 39 or line expansion, as the case may be, will generally provide the sought pressure gradient between respective junctions 34 and 58 and respective ullage spaces 30 and 64.

Referring to FIG. 5, a small opening or drain path 70 may be included in ullage space 64 leading into cryogen space 59. This is provided to facilitate drainage of the ullage space between refuelings. In the embodiment shown, as LNG is consumed from cryogen space 59, any LNG within the ullage space is also forced from the ullage space by gravity in general. While there may be a lag in the drainage of ullage space 64 due to the restrictive size of the drain path, the level of any LNG in the ullage vessel will, in general, match that found in the cryogen space. Generally, drain path 70 allows any amount of LNG within the ullage space to leak out freeing the ullage space 64 of LNG for a subsequent fills. It is important where this drain path is provided, that the drain path be dimensioned such that it will restrict flow of LNG into the ullage space during refueling. As would be apparent to a person skilled in the art, the dimensioning need accommodate drainage from the ullage space over a period much longer than that needed to restrict flow into the ullage space, the time required for refueling. By way of example, drainage would likely be allowed to occur over several hours at least. Refueling is done over the course of several minutes.

Drain path 70 will introduce an ullage vessel that is not closed. As would be appreciated by a person skilled in the art, however, during refueling, the pressure head at junction 58 would create a gradient across drain path 70 initially that would, for the most part, be sealed once LNG was filled within cryogen space beyond the drain path. While, over the course of refueling, a small amount of LNG may be pulled into ullage space 64 through drain path 70 by the combined effects of gravity and the pressure head created at junction 58, the dimensioning of drain path 58 would be established to avoid LNG flow into ullage space 64 over the course of refueling while still remaining appropriately dimensioned to allow drainage between fills. Therefore, throughout most of the refueling process, the ullage space would effectively be a closed system as was the case in the previously described embodiments.

In order to demonstrate the effect created within ullage line 26, the pressure drop $\Delta P$ between junction 34 and 58 and downstream of the slope, as the case may be, is given by:

$$\Delta P = \frac{1}{2}\rho\left(\frac{4Q}{\pi d^2}\right)^2\left[1-\left(\frac{d}{D}\right)^4\right] \quad (1)$$

where Q is the flow rate, d is the inside diameter at junction 34 and 58, $\rho$ is the density of LNG and D is inside diameter 40 and 54 of refueling line 22 and 50 beyond slope 25 and 56. This pressure drop is reflected in the drop in pressure across the ullage line when filling commences. The ratio d/D is the venturi ratio and the expansion ratio, as the case may be, as described above.

As can be seen from the above, the pressure gradient ratio, defined to be a ratio of the respective cross-sectional areas within the refueling line downstream of slopes 25 and 56 and within the refueling line at junctions 34 and 58, respectively, a function of venturi and expansion ratios, d/D, will dictate the pressure gradient created. The closer these two diameters are, the more influence the second part of the above equation will have, driving down the pressure gradient. This influence will always reduce the pressure gradient. By way of example, an appropriate d/D ratio is 4:5.

It is important to note in regards to the above discussion that equation 1 is provided for demonstration purposes only. In the context of this discussion, the diameters discussed are merely representations of cross-sectional area. The important dimension is the cross-sectional area of the refueling line downstream of the slope and cross-sectional area of the refueling line at the junction noted. That is, the example is specific to cylindrical tubing, the material contemplated in the embodiments discussed, and the calculation would need to be adapted should rectangular or other tubing or conduit material be used.

Tubular refueling lines 22 and 50 have the added advantage of reducing the likelihood of creating recirculation or flow separation effects along the refueling line during refueling. As would be understood by a person skilled in the art, it is helpful to eliminate flow separation in order to enjoy the advantages of the present invention, especially in and around junction 34 and 58.

For the purposes of this application recirculation will considered flow separation.

Slope angles or, alternatively, slope lengths are set in part as a result of flow rate and material finish. Flow separation created, in part, by an LNG flow rate and a slope angle below a certain value may fail to provide the sought pressure drop at junctions 34 and 58 as indicated by equation 1, noted above. That is, the effective line diameter or expansion diameter, as the case may be, may be reduced by the creation of flow separation or recirculation in the flow between the junction and the opening into the cryogen space. Ideally, the benefits of the invention are best realized, in part, from a flow of LNG through the refueling line that fills the entire refueling line, with a common flow downstream at all points in the refueling line during the course of filling. Recirculation or flow separation reduces the effective expanse created in the refueling line past the junction. A smooth expansion allows will help to reduce flow separation or recirculation. Based on such variables as the flow rate, materials used for the refueling line and physical properties of the LNG (or any other cryogen or cold material pumped into the tank), a person skilled in the art would be able to determine a satisfactory slope angle or slope length to provide a smooth gradual expansion appropriate for the system in question.

Generally, slope angles should be equal along and around the gradual expanse into the line or expansion diameter, as the case may be, thus distributing equally the expansion in the refueling line. However, as would be appreciated by a person skilled in the art, need not be the case. What is important is the required pressure drop be established at the junction. This will only happen if the flow in the downstream direction expands to move through a greater cross-sectional area than is the case at the junction.

By way of example, the following approximate tank specifications would be appropriate for an LNG holding tank designed to store LNG for a period of 3 to 5 days between refuelings.

Ratio of ullage space (volume) to cryogen space (volume): 1:10
Ratio of venturi diameter to line diameter: 4:5
Ratio of line diameter to expanse diameter: 4:5
Ratio of ullage line diameter to venturi diameter 38: 1:5
Ratio of ullage line diameter to line diameter 52: 1:5
Slope angle (10 finish) for expansion and venturi: 6%

For the purposes of this discussion the fuel considered is LNG, however, as noted above, liquefied hydrogen or other liquefied hydrocarbons can equally take advantage of this invention. Also, an ullage space is advantageous where storage of a cold liquid is required in general. Therefore, the principles provided above need not be limited to fuels but may also be utilized for cryogenic or cold liquid storage generally. By way of example, storage of liquid helium, liquid nitrogen, liquid oxygen, to name just three, all benefit from the provision of ullage space. The present invention can be used for the storage of such liquids.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A cryogenic tank assembly for holding a cryogenic fluid comprising:
   a. a vessel defining a cryogen space,
   b. a ullage vessel defining a ullage space,
   c. a fill conduit comprising
      i. an inlet for receiving said cryogenic fluid from outside said cryogenic tank assembly,
      ii. an exit within said cryogen space for delivering said cryogenic fluid to said cryogenic space during a course of filling of said cryogenic space,
      iii. a broad passage defining a broad cross-sectional area, and,
      iv. a narrow passage defining a narrow cross-sectional area that is smaller than said broad cross-sectional area, wherein said broad passage is downstream from said narrow passage,
   d. an ullage conduit defining an ullage cross-sectional area that is smaller than said narrow cross-sectional area said ullage conduit comprising:
      i. an ullage exit into said fill conduit within said narrow passage, and
      ii. an ullage opening into said ullage space, wherein said cryogenic fluid is restricted from said ullage space during said course of filling.

2. The cryogenic tank assembly claimed in claim 1 wherein said ullage space is substantially empty of said cryogenic liquid upon completion of said course of filling.

3. The cryogenic tank assembly claimed in claim 1 wherein said fill conduit further comprises a slope defining a slope passage between said narrow passage and said broad passage wherein said slope passage expands from said narrow cross-sectional area to said broad cross-sectional area over a distance determined to reduce flow separation within said cryogenic fluid during said course of filling.

4. The cryogenic tank assembly claimed in claim 1 wherein said fill conduit further defines a second broad passage upstream of said narrow passage defining a second broad cross-sectional area greater than said narrow cross-sectional area.

5. The cryogenic tank assembly claimed in claim 3 wherein said ullage vessel is sealed except through said ullage passage.

6. The cryogenic tank assembly claimed in any one of claims 1 through 5 wherein said ullage vessel defines a restrictive drainage opening providing communication between said cryogen space and said ullage space for the purpose of draining said ullage space of said cryogenic liquid prior to said course of filling.

7. A method of filling a cryogenic storage space with a cryogenic fluid while preventing an ullage space at an initial pressure from being filled with said cryogenic fluid, said method comprising:
   a. delivering said cryogenic fluid to said cryogenic storage space through a fill conduit defining a narrow passage and a broad passage, said broad passage disposed downstream from said narrow passage,
   b. allowing fluid communication between said narrow passage and said ullage space through an ullage conduit, said ullage conduit defining an ullage exit into said fill conduit at said narrow passage,
   c. selecting a flow rate for said cryogenic fluid through said fill conduit such that a narrow passage pressure is established at said ullage exit that is lower than said initial pressure while said ullage space is being filled with said cryogenic fluid,
   d. stopping flow through said fill conduit when said cryogen space is substantially liquid full.

8. The method claimed in claim 6 wherein a drop in flow rate is detected once said cryogen space is substantially liquid full, said drop in flow rate is due to flow diversion through to said ullage passage that is more restrictive than flow through said narrow passage.

9. The method claimed in claim 7 further comprising draining at least some of said cryogenic liquid from said ullage space prior to delivering said liquid.

10. The method claimed in claim 7 wherein said flow rate is chosen such that said cryogenic fluid is delivered through said fill conduit substantially free of flow separation.

11. A cryogenic tank assembly for holding a cryogenic fluid comprising:
   a. a vessel defining a cryogen space,
   b. a ullage vessel defining a ullage space,
   c. a fill conduit for directing said cryogenic fluid into said cryogen space, said fill conduit comprising
      i. an inlet for receiving said cryogenic fluid from outside said cryogenic tank assembly, ii. an exit within said cryogen space for delivering said cryogenic fluid to said cryogen space during a course of filling of said cryogenic space, iii. a broad passage defining a broad cross-sectional area, and, iv. a narrow passage defining a narrow cross-sectional area that is smaller than said broad cross-sectional area, wherein said broad passage is downstream from said narrow passage, v. an ullage opening defining an ullage cross-sectional area that is smaller than said narrow cross-sectional area, said ullage opening defining a ullage passage between said narrow passage and said ullage space, wherein said cryogenic fluid is restricted from said ullage space during said course of filling.

12. The cryogenic tank assembly of claim 11 wherein said ullage space is substantially empty of said cryogenic liquid upon completion of said course of filling.

13. The cryogenic tank assembly of claim 11 wherein said fill conduit further comprises a slope defining a slope passage between said narrow passage and said broad passage wherein said slope passage defines a slope cross-sectional area that expands from said narrow cross-sectional area to said broad cross-sectional area over a distance determined to reduce flow separation within said cryogenic fluid during said course of filling.

14. The cryogenic tank assembly of claim 11 wherein said fill conduit further defines a second broad passage upstream of said narrow passage defining a second broad cross-sectional area greater than said narrow cross-sectional area.

15. The cryogenic tank assembly of claims 11 wherein said ullage vessel is sealed except through said ullage passage.

16. The cryogenic tank assembly of claims 11 wherein said ullage vessel defines a restrictive drainage opening providing communication between said cryogen space and said ullage space capable of draining said ullage space of said cryogenic liquid into said cryogen space.

17. A method of filling a cryogenic storage space with a cryogenic fluid while providing for an ullage space for said cryogenic fluid, said method comprising:

a. delivering said cryogenic fluid at a flow rate to said cryogenic storage space through a fill conduit, b. during delivery of said cryogenic fluid, establishing a pressure gradient between said fill conduit and said ullage space, said fill conduit and said ullage space being in fluid communication, said pressure gradient resulting in a flow of fluid in said ullage space towards said fill conduit, c. terminating said delivery of said cryogenic fluid through said fill conduit when said cryogen space is substantially liquid full.

18. The method claimed in claim 17 wherein, said delivery of said cryogenic fluid is terminated when a drop in said flow rate is detected.

19. The method of claim 17 wherein said flow rate establishes a venturi between said fill conduit and said ullage space wherein any fluid in said ullage space is drawn to said fill conduit.

20. The method claimed in claim 17 further comprising draining said cryogenic fluid from said ullage space into said cryogen space prior to delivering said cryogenic fluid.

21. The method claimed in claim 17 wherein said flow rate is chosen such that said cryogenic fluid is delivered through said fill conduit substantially free of flow separation.

* * * * *